Sept. 4, 1928.  G. P. BILLINGS  1,683,438
ROOF FRAMING RULE
Filed Aug. 22, 1927
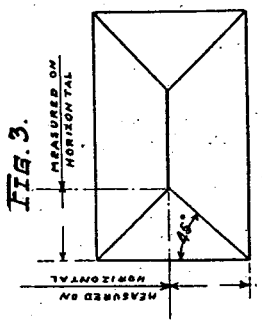
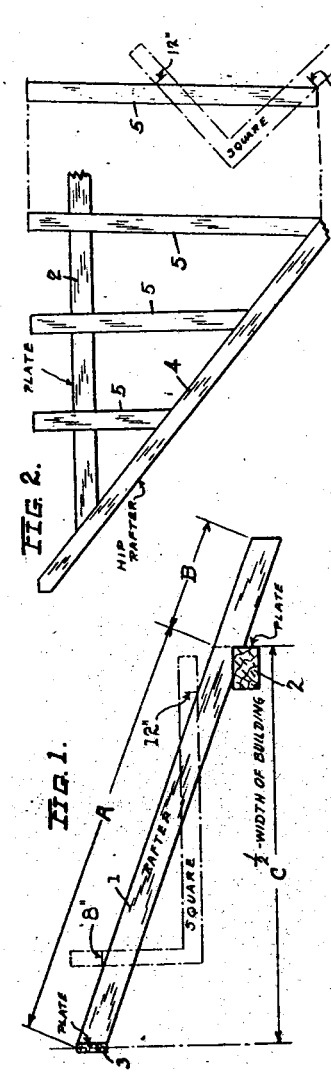
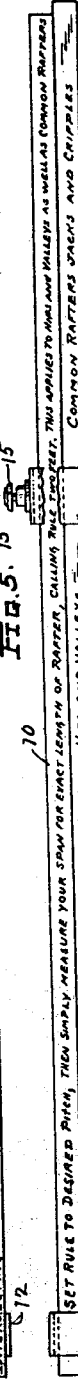
George P. Billings, Inventor.
By Frank S. Greene, Attorney Patented Sept. 4, 1928.

1,683,438

UNITED STATES PATENT OFFICE.

GEORGE P. BILLINGS, OF ALBANY, WISCONSIN.

ROOF-FRAMING RULE.

Application filed August 22, 1927. Serial No. 214,627.

This invention relates to a roof framing rule designed to facilitate cutting of roof framing members to the proper length and at the proper angles for roofs of various inclinations.

It is an object of the invention to provide an extensible rule with a scale by which its length may be varied to measure lengths in the plane of a roof in units proportional to standard units of length along the horizontal in a plane perpendicular to the ridge.

A further object is to provide means by which the length of the rule may be varied to measure either along the pitch line of the roof or along hips or valleys in units proportional to standard units of length along the horizontal in a plane perpendicular to the ridge, so that hip and valley rafters may be measured as well as common rafters, jacks and cripples.

A further object of the invention is to provide means on the rule for measuring predetermined fractional portions of the length of the rule.

A further object is to provide on the rule means for indicating the setting of a carpenter's square for plumb and level cuts on all rafters and also for side cuts on hip and valley rafters, jacks, cripples and roof boards.

A further object is to provide means on the rule for indicating differences in lengths of jacks, placed at different designated distances apart.

With the above and other objects in view, the invention may be said to comprise the rule as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which Fig. 1 is a diagrammatic sectional view showing a roof rafter to which a carpenter's square is set in a position for marking plumb and level cuts.

Fig. 2 is a diagrammatic plan view showing a portion of a hip roof and the setting of a square for the side cut on a jack.

Fig. 3 is a diagrammatic plan view of a hip roof.

Fig. 4 is a top plan view of the rule.

Fig. 5 is a side elevation of the rule.

Fig. 6 is a bottom plan view of the lower scale bar.

Fig. 7 is a top plan view of the lower scale bar.

Fig. 8 is a bottom plan view of the upper scale bar.

In Fig. 1 of the drawing, there is shown a rafter 1 extending from a wall plate 2 to a ridge plate 3. As shown in the drawing, the inclination is such that the rafter has an 8" rise per horizontal foot. In measuring rafters for a roof, it is common practice to measure from a point on the top of the rafter directly over the outer edge of the wall plate to the pitch line of the roof, this dimension being designated "A" in the drawing, and also to measure from the point over the outer edge of the wall plate the dimension indicated as "B" in the drawing for the overhang. The distance measured horizontally from the outer edge of the wall to the center plane of the ridge is equal to one-half of the width of the building and it will be obvious that the length of the rafter from the plane of the outer face of the wall to the ridge will be the hypotenuse of a right angled triangle whose base is one-half the width of the building and whose altitude is the rise of the rafter from the wall plate to the ridge plate, or, in other words, the dimension "A" is equal to one-half the width of the building times the secant of the angle of inclination.

In measuring the length of the rafter, it is common practice to disregard one-half the thickness of the ridge plate with the result that the pitch of the roof is slightly steeper than it would be if the rafter were cut to the theoretically correct length, but this slightly steeper pitch insures that the heel of the rafter will tightly engage the side face of the ridge plate, a condition which is most desirable. The present invention has nothing to do with the measurement of the dimension "B" indicated in Fig. 1, this projection being governed by the width and style of cornice to be used, and this dimension is usually a length equal to a multiple of the width of the planarboard.

The hip and valley rafters ordinarily extend at an angle of 45° to the wall measured on the horizontal, and the length of the hip or valley rafter will be equal to the hypotenuse of a right angled triangle whose base is equal to one half the width of the building times the secant of 45°, i. e., times the square root of 2 and whose altitude is equal to the rise of the rafter from the wall plate to the ridge plate. Fig. 3 of the drawing shows diagrammatically a hip roof in which the hip rafters extend at an angle of 45° to the end walls, the angle being measured on the horizontal.

In hip and valley roofs there are short rafters commonly known as jacks and cripples, the rafters known as jacks extending from a hip rafter to the wall plate and the rafters known as cripples extending from a valley rafter to a hip rafter, to a ridge or to a deck. In Fig. 2, there is shown a hip rafter 4 with jacks 5 extending from the rafter 4 to the wall plate 2.

The present invention consists of an extensible rule provided with suitable scales by which the rule can be readily adjusted to measure hip and valley rafters and common rafters, jacks and cripples, and with means for indicating the proper setting of the carpenter's square for marking plumb, level and side cuts on all rafters, jacks, cripples and roof boards.

Referring to Figs. 4 to 8 of the drawing which show the rule which forms the subject matter of the present invention, it will be observed that this rule consists of an upper scale bar 10 which is telescopically connected to a lower scale bar 11, the scale bar 10 being mounted to slide in a clip 12, secured by a screw 13 to one end of the bar 11 and in a clip 14 which encircles the bars intermediate the ends thereof and which is provided with a set screw 15, by which the bars may be clamped in adjusted positions.

Upon the upper face of the lower scale bar 11, there is provided preferably adjacent an end thereof, a scale formed by graduations 16, extending across the face of the bar. Longitudinal lines 17 and 18 provide central spaces 19 between the graduation 16 and in these spaces are numerals 6, 7, 8, 9, 10, 11 and 12 designating the successive graduations 16. The numerals 6 to 12 indicate different roof inclinations in terms of the number of inches rise per foot in a roof, the 6″ to 12″ inclinations being those most commonly employed in roof construction.

The length of the space between each of the graduations 16 and the zero point of the scale, which is preferably at the end of the bar, plus a predetermined fixed length, is equal to a selected unit of length times the secant of the indicated angle of the inclination. It will be apparent, therefore, that if the predetermined fixed length be laid off on the upper scale bar 10, from the right hand end as shown in the drawing and the bar 10 be adjusted until its right hand end registers with a given graduation 16, the distance from the zero point of the scale to the measuring point on the bar 10 will be equal to the selected unit of length times the secant of the angle to which the rule is set. For convenience in measuring, the zero point of the scale in the rule herein shown is at one end of the lower bar 11 and the upper bar 10 has a length equal to the predetermined fixed length so that its measuring point is at the end thereof opposite the end which overlies the scale, therefore, for any adjustment of the rule determined by the common rafter scale, the length of the extended rule is equal to the selected unit of length, times the secant of the angle of inclination indicated by the graduation on the scale with which the end of the bar 10 is alined.

For instance, if the rule is so graduated that its length when set to one of the graduations 16 is equal to 2′ times the secant of the indicated angle of inclination, or, in the terms of the roof framer, two rafter feet, and the length of the bar 10 be denoted as "a", the distance of each of the graduations 16 from the end of the bar 11 at which the zero point of the scale is located will be 2′ times the secant of the indicated angle of inclination, minus "a". The bars 10 and 11 are preferably of the same length and, in order to provide a spacing of the graduations and an arrangement of the scales with which the rule is provided which will be convenient and which will avoid confusion in the use of the rule, the length of the bars is preferably somewhat greater than the horizontal component of the rafter feet measured by the extended rule. If the rule is designed to measure two rafter feet, a convenient and practical length for the scale bars has been found to be 25¾″.

In Fig. 1 of the drawing, the dimension marked "C" is equal to one-half the width of the building and the rafter 1 has a rise of 8″ per foot. Assuming that the rule is graduated to measure two rafter feet and that one-half the width of the building is 16′, the length "A" on the rafter 1 can be measured by simply adjusting the bar 10 until the end thereof registers with the graduation marked "8" on the scale. The length of the rule will now be 2′ times the secant of the angle which has an 8″ rise per horizontal foot, and the length "A" on the rafter 1 may be measured by laying off the length of the rule 8 times from an end of the rafter.

Between the lines 17 and 18 of the scale and the opposite edges of the scale bar are spaces 20 and 21 between successive graduations 16, which are utilized for data indicating the setting of a carpenter's square for plumb and level cuts on common rafters and for side cuts on jacks, cripples and roof boards. In the spaces 20 are placed numerals corresponding to the inch numerals on the two legs of a carpenter's square to which the square should be set for marking plumb and level cuts. In the spaces 21 are placed the numerals corresponding to the inch numerals to which the two legs of the carpenter square should be set for marking side cuts for jacks, cripples or roof boards for each indicated inclination. The data for the various cuts for the roof frame members at each roof inclination are in the spaces to the right of the graduation 16 for the given inclination so that the data for the various cuts for any given roof inclination is always in the space immediately adjacent the end of the upper bar 10 when the rule is set to measure at the given inclination. If the roof inclination is at a rise of 8" per foot as shown in Figs. 1 and 2, the right hand end of bar 10 will be alined with the graduation marked "8" and in the spaces 20 and 21 immediately to the right of the end of the bar 10 will appear the numerals 12—8, 12—14⅜. For plumb and level cuts, the carpenter's square will be set to the numerals 8 and 12, as shown in Fig. 1, the plumb cuts being along the leg of the square set to the numeral 8 and the level cuts being along the leg of the square set to the numeral 12.

For side cuts for jacks, cripples and roof boards at the 8" inclination, the square will be set to the numerals 12 and 14⅜ as indicated in the space 21 immediately adjacent the end of the bar 10 when the rule is set to measure at this inclination. The setting of the square for side cuts is shown in Fig. 2, the cut being made along the leg of the square set to the numeral other than 12.

The bar 11 is provided on its upper face with a second scale formed by transverse graduations 22 which are positioned beyond the inner end of the first scale, these graduations being designated 6, 7, 8, 9, 10, 11 and 12 to correspond with the designations in the common rafter scale. The zero point of this second scale is identical with the zero point of the first scale being at the right hand end of the scale bar 11. This second scale is for the purpose of measuring the length of hip and valley rafters and the distance of each of the graduations 22 from the end of the bar 11 is such that when the bar 10 is adjusted to a position in which its right hand end is in alinement with the given graduation, the length of the extended rule is in the same proportion to the selected unit of length as the length of the hip or valley rafter in a roof of the designated inclination is to the length of its horizontal projection which ordinarily is one-half the width of the building.

The graduations 22 are intersected by continuations of the lines 17 and 18 providing central spaces 23 for the numerals designating the graduations and providing outer spaces 24 and 25 to receive data indicated in the setting of a carpenter's square for making plumb level and side cuts on the hip and valley rafters, the spaces 24 receiving the data for plumb and level cuts and the spaces 25 receiving the data for side cuts. Since the hip and valley rafters commonly extend at 45° to the side walls measured on the horizontal, it will be apparent that for every foot it advances toward the ridge on a horizontal line, it advances laterally a foot on the horizontal line so that instead of having 12" as a base line, we have the diagonal of a 12 inch square or 12 times the square root of 2, which is approximately 17", and for plumb and level cuts, the carpenter's square has one leg set at 17 and the other to the number of inches rise per foot in the roof as indicated on the second scale on the bar 11.

In view of the greater length of hip and valley rafters, the two scales having their zero point at the same end of the bar can, by making the bars of the proper length as above explained, be laid out for the roof inclinations commonly used with one scale entirely clear of the other, and with the two scales so spaced and designated that there can be no confusion as to the proper setting of the rule for measuring the lengths of rafters.

Since half the width of the building may not be an even number of feet, it is desirable that the rule be provided with means by which fractional portions of its length in any extended position may be measured. To accomplish this, the lower face of the bar 11 is provided with a scale 26, having graduations designated 6, 7, 8, 9, 10, 11 and 12 and each of the graduations so designated is at a distance from an end of the bar equal to a predetermined fractional part of the number of units of length measured by the rule times the secant of the indicated angle of inclination so that for any setting of the rule, this fractional part of the length may be measured from the graduation on the scale 26 corresponding to the graduation on the common rafter scale to which the rule is set to an end of the rule. As herein shown, the distance from each of the graduations on the scale 26 to the right hand end of the bar 11 is equal to one half of the selected unit of measurement times the secant of the indicated angle, so that the distance from each graduation on the scale 26 to the end of the bar 11 is equal to one-half the length of the extended rule when it is set to the corresponding graduation on the common rafter scale.

To the left of the scale 26 is a second scale 27 also having graduations designated 6, 7, 8, 9, 10, 11 and 12 and this scale is for the purpose of measuring a fractional part of the total length of the rule, when the same is set for measuring hip or valley rafters. As herein shown, the spacing of the graduations of the scale 27 from the right hand end of the bar 11 is such that when the rule is set to the corresponding graduation in the hip and valley scale, the graduation on the scale 27 will be at the center of the rule.

At the right hand end of the bar 11 on the bottom face thereof, the rule is provided with means for measuring rafter inches for rafters at various inclinations. This portion of the face of the bar is divided by a longitudinal line 28 upon one side of which transverse lines 29 are provided forming spaces 30 between them and on the other side of which are provided transverse lines 31 forming spaces 32 between them. Spaces 30 are designated to indicate successive roof inclinations and each space is of a length corresponding to one transverse horizontal inch measured along a hip or valley rafter in a roof of the designated inclination. The spaces 32 are designated to indicate successive roof inclinations and each is of a length corresponding to one horizontal inch measured along a common rafter at the indicated inclination.

As shown in Fig. 8, of the drawings, the upper scale bar 10 is provided on its under face with a table showing differences in the lengths of jacks at different standard spacings and also for cripples where there is a difference in their lengths. This table has vertical and horizontal columns formed by transverse and longitudinal lines 33 and 34 and is provided with heading spaces 35 at the tops of the vertical columns in which are indicated the successive roof inclinations and at the left hand ends of the horizontal columns there are heading spaces 36 in which are placed headings indicating different spacings of the jacks. In each of the spaces 37, the difference in lengths of jacks for the designated inclination of roof and for the designated spacing of the jacks is indicated.

It will be apparent that the rule above described can be very quickly set for measuring either common rafters, jacks and cripples or hip or valley rafters; that where the width of the building is not an even number of feet, odd feet and inches may be measured by means of the scales on the bottom of the bar 11; that for each setting of the rule, the proper setting of the carpenter's square for plumb level and side cuts is automatically indicated; and that by reference to the table on the bottom of the bar 10, jacks and cripples running from a valley to a ridge or to a deck may be readily cut to their proper lengths.

What I claim is:

1. A roof framing rule comprising a pair of telescopically connected bars, one of which is provided with a scale having a zero point and consisting of graduations spaced longitudinally of the bar and suitably designated to indicate progressively increasing angles of roof inclination, the other of said bars having an end adjustable along the scale into register with any one of said graduations and having a measuring point thereon, each graduation on the scale being spaced from the zero point a distance such that the distance from the zero point to the measuring point when the rule is set to the graduation is equal to a selected unit of measurement multiplied by the secant of the angle indicated by the graduation on the scale with which the end of the second bar register.

2. A roof framing rule comprising a pair of telescopically connected bars, one of which is provided with a scale extending longitudinally thereof and having its zero point at an end of the bar and consisting of spaced graduations suitably designated to indicate progressively increasing angles of roof inclination, the other of said bars having one end adjustable along the scale into register with any one of the graduations, each graduation on the scale being spaced from the zero point a distance equal to the difference between a length corresponding to a selected unit of measurement times the secant of the indicated angle of inclination and the length of the last mentioned bar.

3. A roof framing rule comprising a pair of telescopically connected bars, one of which is provided with a scale extending longitudinally thereof and having its zero point at an end of the bar and consisting of spaced graduations suitably designated to indicate progressively increasing angles of roof inclination, the other of said bars having one end adjustable along the scale into register with any one of the graduations, each graduation on the scale being spaced from the zero point a distance equal to the difference between a length corresponding to a selected unit of measurement times the secant of the indicated angle of inclination and the length of the last mentioned bar, each space between graduations of said scale having printed therein data indicating the proper setting of a carpenter's square for plumb and level cuts for rafters at the inclination indicated by the graduation at the side of the space away from the zero point.

4. A roof framing rule comprising a pair of telescopically connected bars, one of which is provided with a scale extending longitudinally thereof and having its zero point at an end of the bar and consisting of spaced graduations suitably designated to indicate progressively increasing angles of roof inclination, the other of said bars having one end adjustable along the scale into register with any one of the graduations, each graduation on the scale being spaced from the zero point a distance equal to the difference between a length corresponding to a selected unit of measurement times the secant of the indicated angle of inclination and the length of the last mentioned bar, one of said bars having a scale thereon provided with graduations graduated to correspond with the graduations of the first mentioned scale and each lying at a distance from an end of the bar which is a predetermined fractional part of the length of the extended rule when the same is set to the corresponding graduation on the first mentioned bar.

5. A roof framing rule comprising a pair of telescopically connected bars, one of which is provided with a scale extending longitudinally thereof and having its zero point at an end of the bar and consisting of spaced graduations suitably designated to indicate, progressively, angles of roof inclination varying from one indicated graduation to the next and between selected limits, one inch in rise per horizontal foot, the other of said bars having an end adjustable along the scale into alinement with any one of the graduations, each graduation being at a distance from the zero point of the scale such that the length of the extended rule when set to any graduation is equal to a selected unit of measurement multiplied by the secant of the indicated angle.

6. A roof framing rule comprising a pair of telescopically connected bars, one of which is provided with a scale extending longitudinally thereof and having its zero point at an end of the bar and consisting of spaced graduations suitably designated to indicate, progressively, angles of roof inclination varying from one indicated graduation to the next and between selected limits, one inch in rise per horizontal foot, the other of said bars having an end adjustable along the scale into register with any one of the graduations, each graduation being at a distance from the zero point of the scale such that the length of the extended rule when set to any graduation is equal to the distance along a common rafter between vertical planes parallel with the ridge and spaced apart a distance equal to a selected unit of length, said first mentioned bar having a second scale consisting of spaced graduations designated in a manner similar to the first scale, each graduation of the second scale being spaced from the zero point of the first scale a distance such that the length of the extended rule when the adjustable bar is set to a graduation of the second scale is equal to the distance along a hip or valley rafter between vertical planes parallel with the ridge and spaced apart a distance equal to said selected unit of length.

7. A roof framing rule comprising a pair of telescopically connected bars, one provided with a scale for indicating adjustments of the rule for measuring common roof rafters for roofs of different inclinations and one provided with a scale indicating adjustments of the rule for measuring hip or valley rafters for different roof inclinations, the graduations of both scales being designated to indicate roof inclinations, the spaces between graduations bearing data indicating the setting of a carpenter's square for plumb, level and side cuts at the roof inclinations indicated by adjacent graduations.

8. A roof framing rule comprising a pair of telescopically connected bars, one provided with a scale for indicating adjustments of the rule for measuring common roof rafters for roofs of different inclinations and one provided with a scale indicating adjustments of the rule for measuring hip or valley rafters for different roof inclinations, the graduations of both scales being designated to indicate roof inclinations, one of said bars being provided with graduations for indicating the center point of the rule in each of its extended settings with reference to said scales.

9. A roof framing rule comprising a pair of telescopically connected bars, one provided with a scale for indicating adjustments of the rule for measuring common roof rafters for roofs of different inclinations and one provided with a scale indicating adjustments of the rule for measuring hip and valley rafters for different roof inclinations, the graduations of both scales being designated to indicate roof inclinations, said rule having on one of the bars graduated spaces designated to correspond to the designations of the graduations of the common rafter scale and each of a length equal to the length along a common rafter at the designated inclination which measures a selected unit of length along the horizontal, and other graduated spaces each corresponding in length to the length along a diagonally extending rafter in a roof of the designated inclination which measures a selected unit of length along the horizontal at right angles to the ridge.

10. A roof framing rule comprising a pair of telescopically connected bars provided with graduated scales suitably designated to indicate the adjustment of one of the bars with respect to the other to set the rule to the proper length for measuring common rafters or for measuring hip or valley rafters, for roofs of different designated inclinations, said scales having data associated therewith for indicating the setting of a carpenter's square for plumb and level cuts and side cuts on roof frame members, one of said bars having thereon a table showing the differences in length of jack rafters spaced at given distances apart.

11. A roof framing rule comprising a pair of telescopically connected bars provided with graduated scales suitably designated to indicate the adjustment of one of the bars with respect to the other to set the rule to the proper length for measuring a predetermined number of common rafter feet or for measuring a predetermined number of hip or valley rafter feet for roofs of various designated inclinations, one of said bars having scales for measuring a common single rafter foot or a single hip or valley rafter foot at each designated inclination, and one of the bars having scales for measuring a single common rafter inch or a single hip or valley rafter inch at each designated inclination.

12. A roof framing rule comprising a pair of telescopically connected bars provided with graduated scales suitably designated to indicate the adjustment of one of the bars with respect to the other to extend the rule to the proper length for measuring common rafters or for measuring hip or valley rafters, for roofs of different designated inclinations, both said scales being on the same bar and having a common zero point, said scales being on longitudinally spaced portions of the bar.

13. A roof framing rule comprising a pair of telescopically connected bars provided with graduated scales suitably designated to indicate the adjustment of one of the bars with respect to the other to set the rule to the proper length for measuring common rafters or for measuring hip or valley rafters for roofs of different designated inclinations, additional scales for indicating predetermined fractional portions of the length of the rule when set to any graduation of the first mentioned scales, all of said scales being on the same bar and being on longitudinally spaced portions of said bar.

14. A roof framing rule comprising a pair of telescopically connected bars provided with graduated scales suitably designated to indicate the adjustment of one of the bars with respect to the other to set the rule to the proper length for measuring common rafters or for measuring hip or valley rafters for roofs of different designated inclinations, additional scales for indicating predetermined fractional portions of the length of the rule when set to any graduation of the first mentioned scales, all of said scales being on the same bar and being on longitudinally spaced portions of said bar, and all of said scales having a common zero point.

In testimony whereof I affix my signature.

GEORGE P. BILLINGS.